Sept. 18, 1956     C. P. HOWLE     2,763,063
ROTARY MOUNTINGS FOR SCALES
Filed April 11, 1955
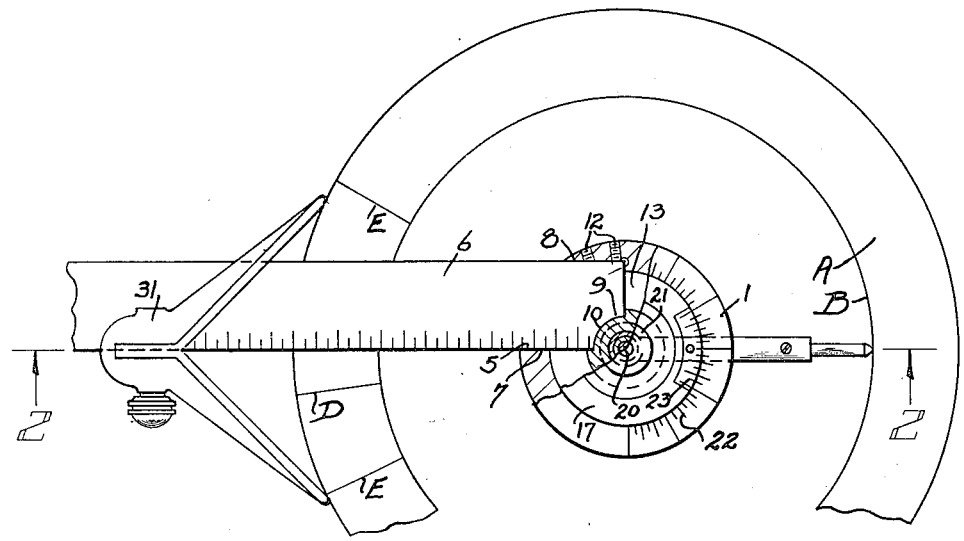
Fig. 1
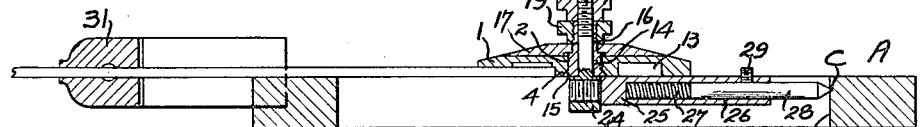
Fig. 2
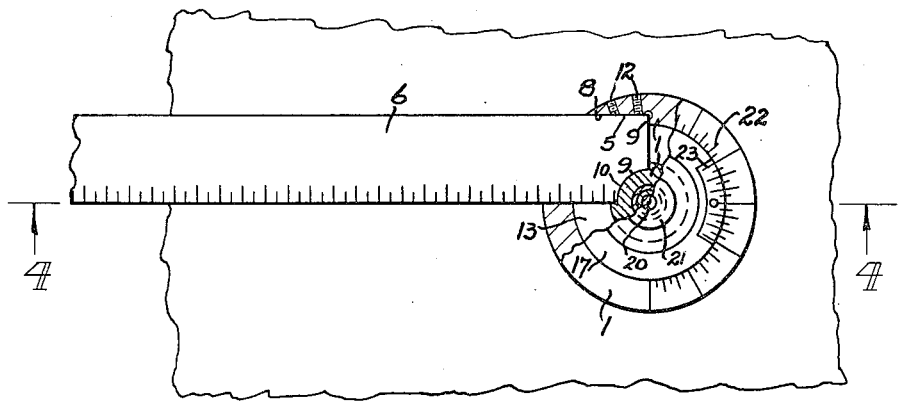
Fig. 3
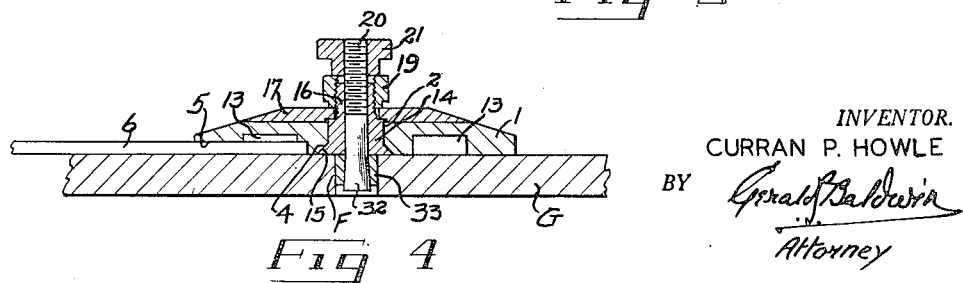
Fig. 4
*INVENTOR.*
CURRAN P. HOWLE
BY 
*Attorney*

United States Patent Office 2,763,063
Patented Sept. 18, 1956

2,763,063

ROTARY MOUNTINGS FOR SCALES

Curran P. Howle, Royal Oak, Mich.

Application April 11, 1955, Serial No. 500,330

6 Claims. (Cl. 33—75)

This invention relates to improvements in rotary mountings for scales. It is an object of the invention to provide a rotary mounting for a conventional scale so that the latter may be easily turned on a piece of stock about a predetermined axis thereon for marking off lines radial to the said axis and at any desired inclination to one another. Moreover the scale is so mounted that it may also be employed for accurately locating points along each line positioned at required distances from the said axis.

Another object of the invention is to provide such a rotary mounting for a scale so that the latter may be employed for quickly and accurately locating lines radial to the axis of the bore of a piece of circular stock and angularly disposed to one another, and for locating points along those lines at required distances from the said axis.

A further object of the invention is to provide such a rotary mounting for a scale which, in a slightly modified form may be readily secured in a construction hole in a piece of stock for locating lines radial to the axis of the said hole and for determining the location of points along those lines at required distances from the said axis.

Having thus briefly and broadly stated some of the objects and advantages of the invention, I will now describe it in detail with the aid of the accompanying drawings, in which:

Figure 1 is a plan view, partly broken away, showing the invention mounted in the bore of a piece of circular stock, and Figure 2 is a sectional view on the line 2—2 of Figure 1.

Figure 3 is a plan view, partly broken away, showing a slight modification wherein the device is mounted in a construction hole in a piece of flat stock, and Figure 4 is an enlarged section on the line 4—4 of Figure 3.

Referring to the drawing, 1 designates a circular plate having a central bore or opening 2 therethrough which is countersunk as shown at 4. Formed in the countersunk side of the plate 1 is an annular recess 13, which may be provided to lighten the said plate, and a slot 5 is also formed therein in which one extremity of a conventional scale 6 is mounted. The slot 5 has parallel sides 7 and 8 spaced to receive and support opposite sides of the scale 6, and the depth of the slot is preferably the same as the thickness of the scale. The side 7 is radial to the axis of the plate 1 and extending from the inner extremities of the sides 7 and 8 are inner wall portions 9. The outer end of the wall portion 9 extends from the side 8 at right angles to the latter and radial to the plate axis, and the inner wall portion for the major part of its length is in the form a quadrant coaxial with the said plate. One corner of the scale 6, which would have coincided with the plate axis, has been removed thereby forming a segmental cavity 10 to fit against the quadrant-shaped portion of the wall 9.

Extending substantially radially through the circular plate from its circumference are a plurality of tapped openings having screws 12 therein which extend through the side 8 of the slot 5 and engage the adjacent edge face of the scale 6 thereby securing the inner extremity of the scale against the wall portions 9.

Rotatably mounted in the bore or opening 2 is an annular hub 14 having an outwardly tapered extremity 15 which lies in rotary engagement with the countersink 4. The hub projects through and slightly beyond the face of the plate 1 remote from its countersunk side and integral with that outwardly projecting extremity and coaxial therewith is an annular shank 16 of reduced diameter which is extrenally threaded. A disc 17 of smaller diameter than the plate 1 rests upon the hub 14 and is centrally bored for the passage of the shank 16 therethrough. The inner face of the disc 17 is also slightly counterbored to receive the adjacent extremity of the said hub. In threaded engagement with the shank 16 is a nut 19 by which the disc is held in firm engagement with the hub for rotation therewith. Extending through the hub 14 and its shank 16 is a spindle 20 which is threaded at one extremity to receive a nut 21 which is tightened against the nut 19 so that the said spindle, hub and disc may be rotated as a unit, and provided on the opposite extremity of the spindle and extending outwardly from the hub are means hereinafter described for engaging a piece of stock.

The outer peripheral portion of the plate 1 is radially upwardly inclined from its outer margin to the periphery of the disc 17, and the upper face of the latter is similarly radially upwardly inclined from its outer margin. Marked on the inclined portions of the plate 1 and disc 17 are graduations 22 and 23, respectively, which are laid out in degrees or fractions thereof, so that the scale 6 and plate 1 may be turned to any desired angle about the hub 14 and the disc 17 and the angle through which the scale has been turned may be readily determined by the coacting graduations.

In the arrangement shown in Figures 1 and 2 the rotary mounting is adapted for use on a piece of circular stock A having a central bore B. In this instance a head 24 integral with the lower extremity of the spindle 20 projects beneath the hub 14. Mounted in and extending radially from the head 24 is an arm 25 which is tubular from its outer extremity for a portion of its length as shown at 26. Mounted in the tubular portion 26 is a helical spring 27 which tends to force a pin 28, also mounted in the said tubular portion of the arm 25, outwardly. Formed radially through the tubular portion is a tapered opening to receive a set screw 29 by which the pin 28 may be held immovable and the spring 27 under compression.

The pin 28 is so set that it projects from the axis of the head 24 a distance equal to the radius of the bore B, and the set screw 29 is then tightened. The head 24 and the arm 25 are inserted in the bore B with the pin 28 against the wall of the latter, and the underside of the plate 1 and the scale 6 upon the stock A. A conventional centerhead 31 is secured in the usual manner on the scale and is so positioned thereon that the distance from the centerhead to the axis of the mounting, which can be readily determined from the scale, is the same as the radius of the stock A, since the inner extremity of the scale, had it not been removed, would have coincided with the axis of the mounting.

The device is then removed from the stock and the set screw 29 is loosened to permit outward movement of the pin 28. The latter is then inserted in a prick punch mark or other indentation C formed in the bore B and the centerhead 31 is pressed into contact with the periphery of the stock A. The plate 1 is then moved about the hub 14 to bring a graduation 22 thereon into registry with one of the graduations 23 on the disc 17. Then a radial base line D may be scribed on the stock, after which the position of other lines E each exactly the desired inclination to the base line and to one another may be readily located by turning the plate 1 about the hub 14 while retaining the centerhead 31 against the periphery of the stock and the pin 28 in engagement with the indentation C. Moreover, as previously stated, not only may the position of the radial lines be thus quickly and accurately located, but, with the aid of the scale, exact distances along those lines from the axis of the bore B may be readily ascertained.

In the arrangement shown in Figures 3 and 4 the lower extremity 32 of the spindle 20, which extends beneath the hub 14, is tapered so that its diameter increases toward its lower extremity. Mounted around the tapered extremity 32 is a split bushing 33 having a correspondingly tapered bore so that as the nut 21 is tightened, and the bushing 33 is held against upward movement by the underside of the hub 14, the bushing is expanded to engage the bore of a construction hole F in a flat piece of stock G. The plate 1 and the scale 6 may then be turned about the hub 14 which is held immovable by the bushing 33, so that the plate is rotated relative to the disc 17 for use as above described. In this instance, of course, the centerhead is dispensed with.

While in the foregoing the preferred embodiments of the invention have been described and shown, it is understood that further alterations and modifications may be made thereto provided the said alterations and modifications fall within the scope of the appended claims.

What I claim is:

1. A rotary mounting for scales comprising a circular plate having a central opening therethrough, a hub rotatably mounted in said opening, a disc of smaller diameter than the plate secured on said hub for rotation upon the plate, said plate and hub having coacting graduations thereon for determining angular movement of one relative to the other, a scale, the plate having a slot formed in its face remote from the disc to receive one extremity of the scale, means coacting with the plate for holding the scale immovable in its slot, one side of the slot and scale being radial to the plate axis whereby measurements along the scale denote distance from said axis, a head coaxial with the hub and mounted for rotation therewith, said head being axially adjustable relative to said hub, and means on the head for engaging the bore of a hole in a piece of stock and holding the hub and disc stationary while the plate and scale are rotatable about the plate axis.

2. The combination in claim 1, wherein the means on the head for engaging the bore of a hole includes the head being tapered and of outwardly increasing diameter, a split bushing having a tapered bore around the tapered head, and means for moving the head axially relative to the hub.

3. The combination in claim 1, wherein the means on the head for engaging the bore of a hole includes an arm projecting radially from the head, said arm being tubular from its outer extremity, and an axially adjustable pin mounted in the tubular arm and projecting therefrom.

4. A rotary mounting for scales comprising a circular plate having a central opening therethrough, an annular hub rotatably mounted in said opening having a tubular externally threaded shank projecting from one extremity, a disc of smaller diameter than the plate through which the shank extends, a nut on the shank holding the disc against the adjacent extremity of the hub and in close proximity to the plate whereby the disc and hub are rotatable relative to said plate, the plate and disc having coacting graduations thereon for determining angular movement of one relative to the other, coacting means on the hub and plate for limiting the movement of the hub through the opening when the nut is tightened, a scale, the plate having a slot formed in its face remote from the disc to receive the scale, one side of the scale and slot being radial to the axis of the plate opening, means in the plate for holding the scale immovable in its slot, a spindle extending through the hub and shank threaded from one extremity, a second nut on the threaded extremity of the spindle, a head on the opposite extremity of the spindle, and means on the head for engaging the bore of a hole in a piece of stock and holding the hub and disc stationary while the plate and scale are rotatable about the plate axis.

5. The combination in claim 4, wherein the means on the head for engaging the bore of a hole includes the head being of outwardly increasing diameter, a split bushing having a correspondingly tapered bore around the head, and said bushing being adapted to be expanded by the tightening of the second nut against the first named nut.

6. The combination in claim 4, wherein the means on the head for engaging the bore of a hole includes an arm projecting radially from the head, said arm being tubular from its outer extremity for a portion of its length, a pin mounted in the tubular arm and projecting therefrom, and a spring in said tubular arm urging the pin outwardly.

No references cited.